（12）United States Patent
Jasapara et al.

(10) Patent No.: US 7,271,916 B2
(45) Date of Patent: Sep. 18, 2007

(54) CHARACTERIZATION OF OPTICAL FIBER USING FOURIER DOMAIN OPTICAL COHERENCE TOMOGRAPHY

(75) Inventors: Jayesh Jasapara, Watchung, NJ (US); Andrew D. Yablon, Livingston, NJ (US)

(73) Assignee: Fitel USA Corp, Norcross, GA (US)

( * ) Notice: Subject to any disclaimer, the term of this patent is extended or adjusted under 35 U.S.C. 154(b) by 310 days.

(21) Appl. No.: 10/784,763

(22) Filed: Feb. 23, 2004

(65) Prior Publication Data

US 2004/0227952 A1 Nov. 18, 2004

Related U.S. Application Data

(63) Continuation-in-part of application No. 10/704,057, filed on Nov. 6, 2003, now Pat. No. 7,057,735.

(60) Provisional application No. 60/426,272, filed on Nov. 14, 2002.

(51) Int. Cl.
*G01B 9/02* (2006.01)
(52) U.S. Cl. .................................. 356/497
(58) Field of Classification Search ............... 356/460, 356/477, 479, 480, 481, 482, 485, 487
See application file for complete search history.

(56) References Cited

U.S. PATENT DOCUMENTS

| | | | | |
|---|---|---|---|---|
| 4,168,907 A | * | 9/1979 | Presby | 356/73.1 |
| 5,202,745 A | * | 4/1993 | Sorin et al. | 356/479 |
| 5,341,205 A | * | 8/1994 | McLandrich et al. | 356/479 |
| 5,410,396 A | * | 4/1995 | Rochester | 356/73.1 |
| 5,440,141 A | * | 8/1995 | Horie | 356/504 |
| 5,523,840 A | * | 6/1996 | Nishizawa et al. | 356/497 |
| 5,565,986 A | * | 10/1996 | Knuttel | 356/456 |
| 5,633,712 A | * | 5/1997 | Venkatesh et al. | 356/503 |
| 5,731,876 A | * | 3/1998 | Venkatesh et al. | 356/503 |
| 6,134,003 A | * | 10/2000 | Tearney et al. | 356/479 |
| 6,226,086 B1 | * | 5/2001 | Holbrook et al. | 356/630 |
| 6,496,265 B1 | * | 12/2002 | Duncan et al. | 356/479 |

(Continued)

FOREIGN PATENT DOCUMENTS

| | | | |
|---|---|---|---|
| DE | 10207186 | * | 2/2002 |
| JP | 10311708 A | * | 11/1998 |
| WO | PCT/CH05302 | * | 4/2002 |

OTHER PUBLICATIONS

Massig et al. Fringe-pattern analysis with high acuracy by use of the Fourier-transform method: theory and experimental tests; Applied Optics; May 1, 2001; vol. 40, No. 13; pp. 2081-2088.*

(Continued)

*Primary Examiner*—Samuel A. Turner
(74) *Attorney, Agent, or Firm*—Wendy W. Koba

(57) ABSTRACT

A fiber characterization arrangement utilizes Fourier domain optical coherence tomography (FDOCT) to measure the cross-section of optical fibers, thus providing information sub-surface features, coating thickness/concentricity and stress-induced birefringence under tension. The FDOCT technique can also be used to study microstructured fibers. By making FDOCT measurements on a fiber placed in a cavity, the geometric and optical thickness of the fiber can be simultaneously measured, allowing for the determination of the refractive index of the fiber.

16 Claims, 5 Drawing Sheets

U.S. PATENT DOCUMENTS 6,661,502 B1* 12/2003 Jakobsen et al. .......... 356/73.1
6,961,123 B1* 11/2005 Wang et al. ................ 356/364
2005/0140981 A1* 6/2005 Waeiti ....................... 356/479
2005/0190371 A1* 9/2005 Knuttel ...................... 356/479

OTHER PUBLICATIONS

Froggat et al. All-fiber wavemeter and Fourier-transfoorm spectrometer; Optics Letters; Jul. 15, 1999; vol. 24; No. 14;pp. 942-944.*

Nishimura et al. Mode-field expansion and reduction in dispersive fibers by local heat treatments. IEEE Journal of Selected Topics in Quantum Electronics, vol. 5, No. 5, Sep./Oct. 1999, pp. 1260-1265.*

Jauncey et al. Narrow-linewidth fiber laser operating aty 1.55 microns. Optics Letters; vol. 12; No. 3; Mar. 1987; p. 164-165.*

IBM Technical Disclosure Bulletin, NN931249, Dec. 1993, pp. 1-5.*

* cited by examiner

CHARACTERIZATION OF OPTICAL FIBER USING FOURIER DOMAIN OPTICAL COHERENCE TOMOGRAPHY

CROSS-REFERENCE TO RELATED APPLICATIONS

This application is a continuation-in-part of U.S. Ser. No. 10/704,057, filed Nov. 6, 2003, now U.S. Pat. No. 7,057,735, which claims the benefit of U.S. Provisional Application No. 60/426,272, filed Nov. 14, 2002.

TECHNICAL FIELD

The present invention relates to a system and method for characterizing an optical fiber and, more particularly, to utilizing Fourier domain optical coherence tomography (FDOCT) to detect sub-surface features, coating thicknesses and concentricity, as well as the refractive indices of the various layers forming the fiber.

BACKGROUND OF THE INVENTION

Optical fiber technology requires precise characterization and control of various fiber properties during the process of drawing the fiber from a preform. For example, control of the glass dimensions is crucial to the waveguiding properties of the fiber, such as its dispersion, micro-bend losses and scattering losses. The coating thickness influences the bend loss properties, splicing and cabling. Detection of air lines within the fiber is important for loss and strength quality control. Fiber eccentricity leads to polarization mode dispersion (PMD). Thus, all of these quantities need to be monitored during the draw process, without perturbing the fiber or the process.

Over the years, fiber dimension measurements have been addressed using two techniques: (1) the "shadow technique" where a laser beam is scanned across a fiber and the change in transmission is analyzed to retrieve the fiber dimensions, and (2) the "forward scattering technique" which is an interferometric technique that analyzes the interference between light transmitted through a fiber and light reflected by a fiber to determine the fiber diameter. Currently, the accuracy of these prior art techniques is limited to approximately 0.1 µm.

To date, fiber eccentricity is calculated by measuring the fiber dimensions is two orthogonal directions, using one of the two above-described techniques. However, in today's fibers, the differences in dimension in the two directions approaches approximately 100 nm, which is at the limit of currently available measurement techniques. At high data transfer rates, even a sub-100 nm difference results in significant PMD. Thus, there remains a need for a method and system for measuring fiber eccentricity, as well as other characteristics, with improved, nm scale accuracy.

Additionally, there are some properties that cannot be measured using the prior art techniques. For example, fiber-coating concentricity cannot be measured if the coating refractive index is less than the refractive index of the fiber itself, which is the case for at least one class of fibers currently defined as "hard clad silica" (HCS) fiber. In other cases, a dual polymer coating is applied simultaneously at the same physical location on the draw tower, and there is no technique that can be used to measure the thickness of the inner coating, where this inner coating plays a crucial role in determining the micro-bend loss properties of the fiber. It is also desirable to measure the refractive index of the fiber through the various stages in the draw tower, so as to determine parameters such as fiber temperature, stress and strain, where all of these properties can further affect the PMD.

The manufacture of optical fibers requires strict control of many parameters during the draw process in order to achieve the necessarily tight specifications on the refractive index profile. In particular, fiber tension during draw has been found to directly impact the index difference between various regions of the fiber and is therefore one of the most important draw parameters. Most prior art non-contact tension measurement gauges in use on draw towers today measure the mechanical vibration of the fiber after perturbing the fiber with a puff of air, considered to be a rather inaccurate and undesirable measurement technique. One prior art arrangement has been developed which measures the polarization-dependent side scatter from the fiber. This technique is nonlinear and considered to be inaccurate for large tensions, since its accuracy is dependent upon the fiber movement and ellipticity.

With the push towards increasing the rate and distance of data transmission on a single optical fiber, the quality of the optical fiber is of paramount importance. An improved ability to measure the various above-described fiber characteristics, including refractive index, is considered to be critical.

SUMMARY OF THE INVENTION

The need remaining in the prior art is addressed by the present invention, which relates to a system and method for characterizing an optical fiber and, more particularly, to utilizing Fourier domain optical coherence tomography (FDOCT) to detect sub-surface features, coating thicknesses and fiber-coating concentricity, as well as the refractive indices of the various layers forming the fiber.

In accordance with the present invention, the FDOCT technique utilizes back scattered light to reconstruct the transverse cross section of the fiber, providing information on the glass, coating and defects in a single measurement. In particular, a broadband light source is focused to provide an input beam at a direction essentially perpendicular to the fiber sidewall. The light reflections from each material interface (e.g., air/fiber, coating/cladding region, etc.) will interfere with one another, forming an interference pattern in the spectral domain. The retro-reflected light from these various interfaces is subsequently applied as an input to a spectrometer, which will then generate a spectrogram of the interference pattern. In accordance with the present invention, a fast Fourier transform (FFT) of the spectrogram is then generated, where the peaks of the FFT will coincide with the physical locations of each material interface. By analyzing the interference pattern corresponding to each peak, the thickness of each layer within the fiber (as well as the overall fiber diameter) can be determined.

The FDOCT technique of the present invention can be extended to simultaneously measure the geometrical and optical thickness of the fiber to a value within 10 nm, by placing the fiber in an optical cavity during the measurement process. With these geometrical and optical thickness measurements, the refractive index of the fiber can then be derived.

Other and further features and advantages of the present invention will become apparent during the course of the following discussion and by reference to the accompanying drawings.

BRIEF DESCRIPTION OF THE DRAWINGS

Referring now to the drawings.

DETAILED DESCRIPTION

Prior to describing the specific embodiments of the present invention, it is useful to understand, at least in general terms, the underlying principles used to implement the Fourier domain technique in arriving at the capability of performing the desired measurements.

Figure 1:
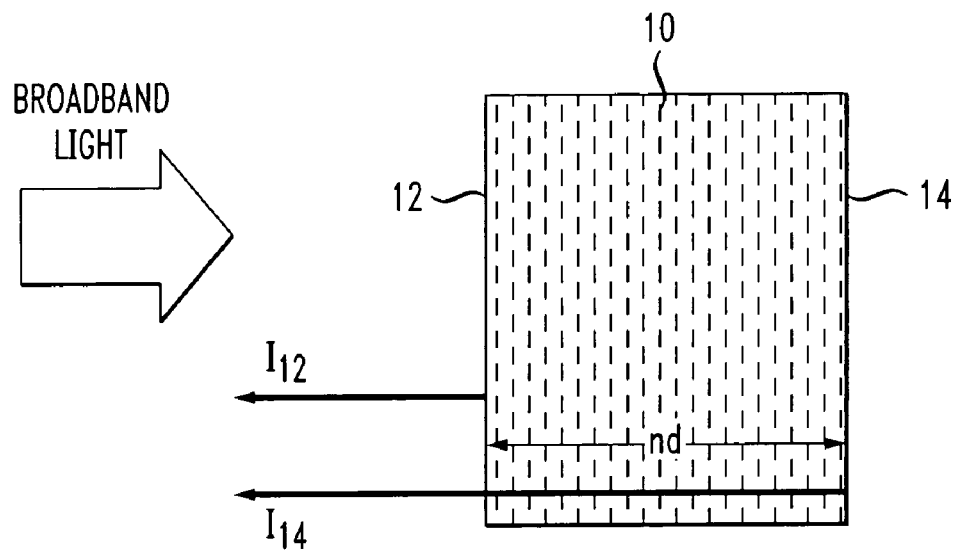
FIG. 1 illustrates the reflections from a front surface and rear surface of a "bare fiber", or other optical object, where these reflections will interfere constructively and form a spectrogram that can be analyzed to determine the characteristics of the fiber.

With reference to FIG. 1, when broadband light impinges a dielectric object 10 of index n and geometrical thickness d (such as a fiber), the light reflected from a front surface 12 and a back surface 14 will interfere. If the reflectivity of surfaces 12 and 14 is low so that multiple reflections can be ignored, the reflected intensity is given by:

$$I(\lambda) = I_{12} + I_{14} + 2\sqrt{I_{12}I_{14}}\cos(\Delta\Phi),$$

where $I_{12}$ and $I_{14}$ are the reflected intensities from front surface 12 and back surface 14, respectively, $\lambda$ is the wavelength of light in vacuum, and $\Delta\Phi = 2\pi(2nd)/\lambda + \Delta\Phi_G + \pi$ is defined as the phase difference between the two reflections. The total phase difference arises due to three separate factors: (1) the propagation of the light signal through object 10; (2) the Gouy phase difference $\Delta\Phi_G$ and; (3) the $\pi$ phase change on reflection from air to the dielectric interface. Since $\Delta\Phi$ is wavelength dependent, the reflected intensity is modulated as a function of wavelength, with constructive interference occurring at wavelengths where the phase difference is an integral multiple of $2\pi$. The spectrogram generated during the measurement can therefore be fitted to retrieve the optical thickness nd of the fiber.

Figure 2:
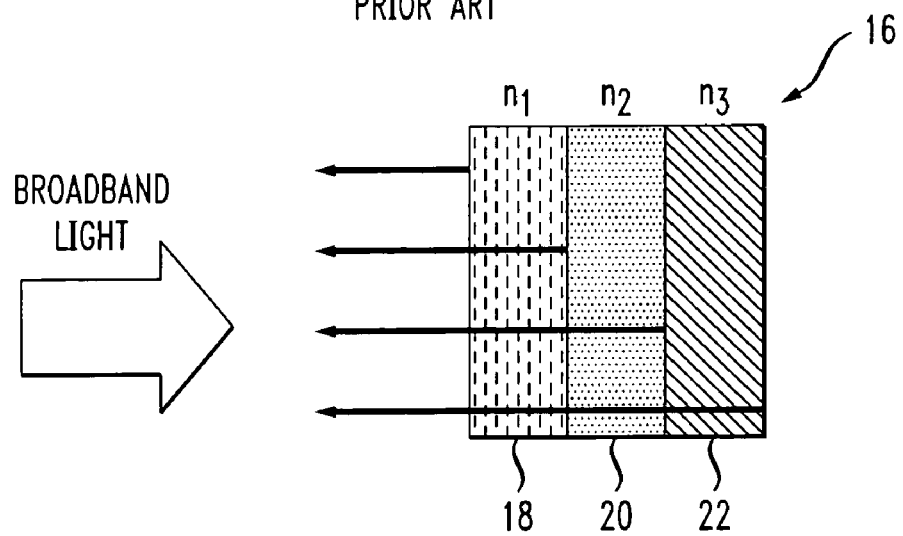
FIG. 2 illustrates a variation of the arrangement of FIG. 1, where the "bare fiber" is replaced with an optical object comprising three separate material layers, with a reflection occurring at each interface between the layers.

If multiple layers of different indices are present, a reflection will occur at each interface. FIG. 2 illustrates a three-layer dielectric object (fiber) 16 comprising a first layer 18, a second layer 20 and a third layer 22. The reflections from each interface, illustrated by the set of four arrows in FIG. 2, interfere with each other to produce modulations at frequencies corresponding to the optical path difference (OPD) between them. The reflected intensity for the multiple layer model is then given by:

$$\frac{I(\upsilon)}{I_o(\upsilon)} = \sum_i R(z_i) + \sum_i 2\sqrt{R(z_i)} \sum_{j \neq i} \sqrt{R(z_j)} \cos[2\pi\upsilon 2(z_i - z_j)/c],$$

where $\upsilon$ and c are the frequency and speed of light in a vacuum, respectively, $I_o(\upsilon)$ is the spectral intensity of the incident light, and $R(z_i)$ is the reflectivity of the interface at the "optical distance" $z_i$ in the object. The optical distance $z_i$ is defined as the product of the refractive index n and the physical distance d traveled from the first surface of the object to the $i^{th}$ interface. As used in accordance with the present invention, the fast Fourier Transform (FFT) of the reflected intensity contains peaks at frequencies corresponding to the optical distances $2(z_i - z_j)$ between the various interfaces. Therefore, each peak in the FFT can be filtered and analyzed to reconstruct the index profile of the multi-layered object, where to arrive at the correct solution, it is important that the peak in the FFT domain be well-defined. The resolution in the FFT domain $(F_R)$ is given by the relation $F_R = c/2(\nu_L - \nu_o) = \lambda_L \lambda_o / 2(\lambda_L - \lambda_o)$, where $\nu_o$ and $\nu_L$ are the minimum and maximum frequencies of light, respectively, and $\lambda_o$ and $\lambda_L$ are the corresponding wavelengths. The FFT domain resolution $F_R$ can be improved by increasing the spectral range over which data is recorded and/or by using shorter wavelengths.

Once the right peak in the FFT is identified, it can be filtered and the inverse FFT (IFFT) can be taken to retrieve the spectral modulation to which it corresponds. This spectral modulation is extremely sensitive to nanometer scale changes in dimensions. For example, a change in optical thickness $\Delta d$ is related to the shift in peak wavelength $\Delta\lambda$ in the spectral modulation by the relation:

$$\frac{\Delta d}{d} = \frac{\Delta\lambda}{\lambda}.$$

Therefore, the sensitivity depends on the minimum detectable fringe shift, which is equal to the resolution of the spectrometer that is used. For example, for an object of thickness (d) of 125 μm, and a center wavelength (λ) of 1550 nm, with a spectrometer of resolution (Δλ) of 0.1 nm, the minimum detectable change (Δd) will be 8 nm. Thus, the technique of the present invention is capable of providing sub-10 nm sensitivity, which is approximately a ten-fold improvement over the prior art.

For the purposes of discussion, the use of the FDOCT technique will be discussed in terms of measuring the parameters associated with an optical fiber. However, it is to be understood that the FDOCT measurement technique of the present invention is equally applicable for use with any optically transparent object.

Figure 3:
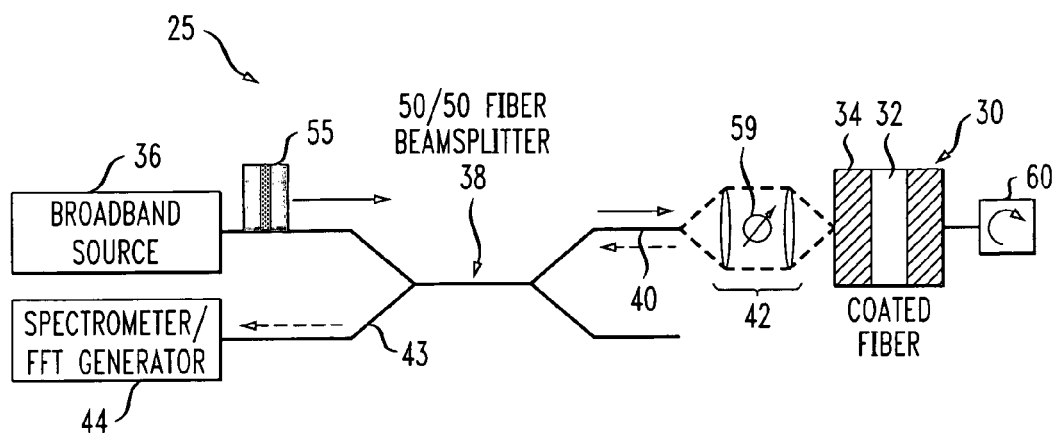
FIG. 3 illustrates an exemplary FDOCT measurement arrangement formed in accordance with the present invention.

FIG. 3 illustrates an exemplary FDOCT arrangement 25 of the present invention used to measure the optical thickness of an optical fiber 30, where optical fiber 30 is shown to include a cladding region 32 and outer coating layer 34. As shown in FIG. 3, and with respect to the above discussion in accordance with FIG. 2, reflections will occur at each interface between a change in materials. That is, a first air-coating interface A will exist at the interface between "air" and the front surface of coating layer 34, a first coating-cladding interface B will exist at the first interface between coating layer 34 and cladding 32, a second coating-cladding interface C will exist at the opposing interface between cladding 32 and coating layer 34, and, lastly, second air-fiber cladding interface D will exist at the interface between the outer surface of coating layer 34 and the surrounding "air". As discussed below, the technique of the present invention utilizes a broadband input light source and a spectrometer to provide the necessary measurements to yield the Fourier transform data associated with the fiber characteristics.

Referring to the particular FDOCT arrangement 25 of FIG. 3, an input light beam from a broadband source 36 is first coupled into a 50:50 beamsplitter 38. One output arm 40 of beamsplitter is subsequently collimated and focused through a pair of lenses 42 with a low numerical aperture (NA) onto fiber 30. The retro-reflected light from fiber 30 is then collected by the pair of lenses 42 and focused back into beamsplitter 38. Advantageously, beamsplitter 38 then functions as a point receiver to further discriminate against light that is not perfectly retro-reflected and carries the reflected light along beamsplitter arm 43 and into spectrometer 44. As discussed above, spectrometer 44 then records the received spectral fringes on a detector array.

In experiments using the above-described arrangement 25 of FIG. 3, two different broadband sources and detectors were used. Other broadband sources are possible for use in general and considered to fall within the scope of the present invention. For low-resolution experiments, an Er$^+$-fiber ASE source was used as broadband light source 36. An optical channel monitor with an approximately 40 nm bandwidth was used as spectrometer 44. For high resolution experiments, a continuum source 36, with a 300 nm bandwidth ranging from 1400 nm to 1700 nm was used.

Figure 4:
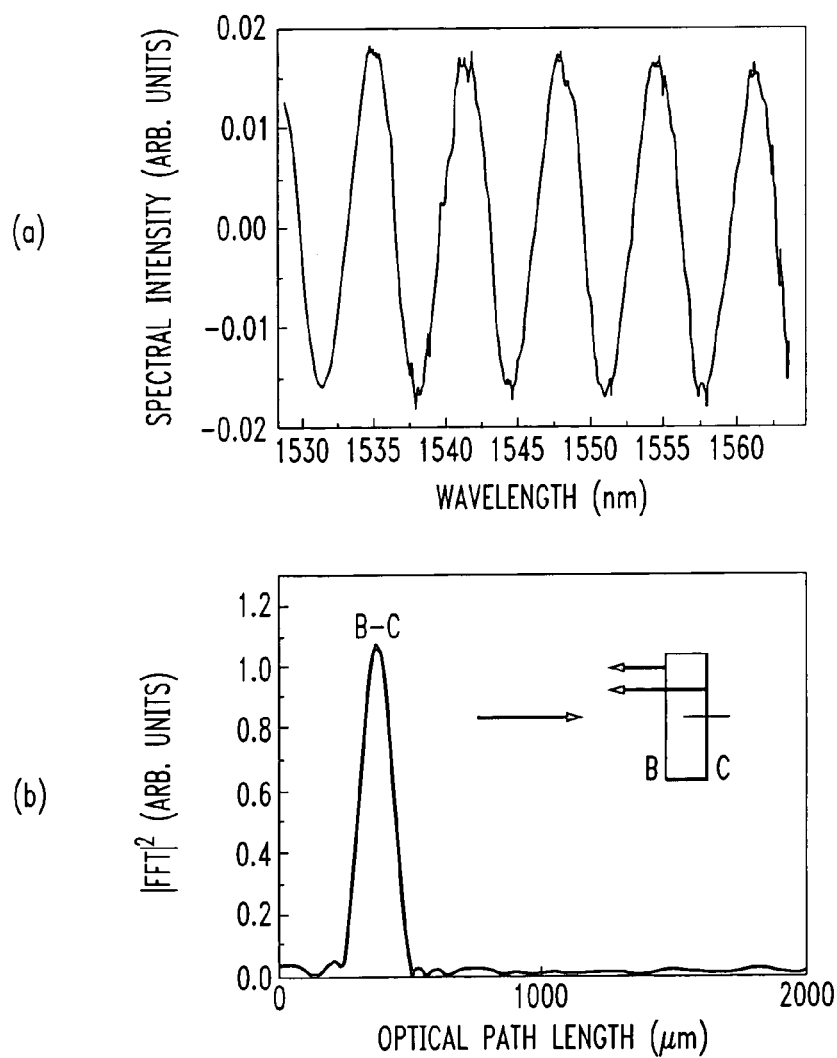
FIGS. 4(a) and (b) illustrate an exemplary spectrogram and FFT, respectively, that may be obtained by measuring a "bare fiber" in the arrangement of FIG. 3.

The application of the FDOCT measurement technique of the present invention with a conventional bare fiber inserted in place of fiber 30 in arrangement 25 can be understood with reference to FIG. 4, where FIG. 4(a) contains the spectrogram of the reflection of a bare fiber is inserted in arrangement 25, where this reflection is shown to take the form of a cosine signal, and FIG. 4(b) illustrates the FFT of this cosine signal, resulting in a single peak. A small diagram of a "bare fiber" as used in this application is shown as an insert in the graph of FIG. 4(b), with the front reflecting surface of the fiber defined as surface "B" and the rear reflecting surface of the fiber defined as surface "C".

In accordance with the present invention, the location of the FFT peak B-C can then be used as an initial estimate to the fit of the cosine modulation used to retrieve the optical thickness of the fiber. Any change in the optical path length (OPL) will cause a shift of the fringes. As discussed above, changes less than 10 nm can be detected with this arrangement with a spectral resolution of 0.1 nm. Accordingly, a simultaneous measurement of the fiber thickness from two orthogonal directions can be used to measure very small amounts of fiber eccentricity.

An advantage of the FDOCT technique of the present invention is that it contains information regarding the "volume" of the fiber. Hence, sub-surface features such as air lines, multiple layers, etc. can be detected, since each feature will introduce another retro-reflected signal. A single FDOCT measurement can be used to reconstruct the refractive index distribution across a coated fiber cross-section, where this information can then be used to derive information about the coated and uncoated fiber diameters, as well as the fiber-coating concentricity.

Figure 5:
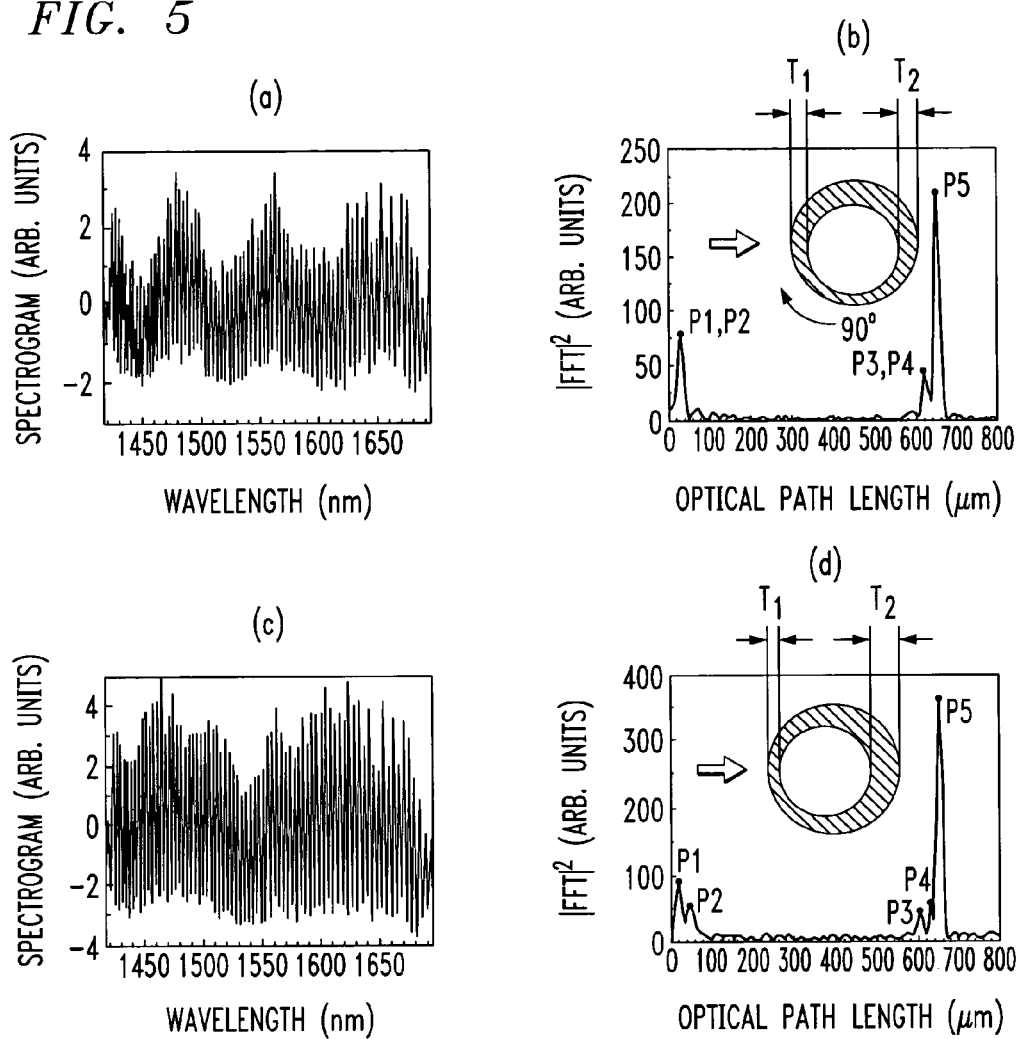
FIGS. 5(a)-(d) illustrate a pair of spectrograms and associated FFTs that may be used to analyze the fiber concentricity, with a first spectrogram and FFT measured along one axis (FIGS. 5(a) and (b)), and a second spectrogram and FFT (FIGS. 5(c) and (d)) measured along a direction orthogonal to FIGS. 5(a) and (b)

Traditional concentricity monitors rely on total internal reflection to occur at the coating-glass interface and therefore require that the coating be of a higher refractive index than the core fiber glass. This limitation does not apply to the inventive FDOCT technique and therefore both high and low index coatings can be measured. Since the inventive technique is non-contact and non-perturbative to the fiber, it is suitable for use during the draw process. FIGS. 5(a)-(d) illustrate the use of the inventive FDOCT technique to determine the concentricity of a coated fiber, where this determination is made by using a pair of orthogonal FDOCT measurements. In particular, FIG. 5(a) is the spectrogram and FIG. 5(b) is the associated FFT for a fiber consisting of a $D_s \approx 205$ μm diameter glass, with a total coating thickness (e.g., AB+CD, from FIG. 3) of approximately 22 μm. Once the measurements for this orientation are complete, the fiber is rotated 90° and the measurements are repeated for the spectrogram and FFT of FIGS. 5(c) and (d), respectively. As discussed above in association with arrangement 25 of FIG. 3, the reflections from air-coating interfaces A and D, and the reflections from coating-glass interfaces B and C interfere with each other, giving rise to spectral modulations at frequencies corresponding to the phase difference between the reflected signals. It is to be understood that an alternative arrangement for providing the orthogonal measurements may be used, where instead of re-orienting the fiber, the return reflections may be passed through a polarization beam splitter, such that each polarization is directed into a separate optical spectrometer. In this case, the signals may be processed simultaneously, and arrive at the results, as shown below, that will indicate any eccentricity in the fiber-cladding arrangement.

Referring to FIG. 5(b) and the diagram insert, the fiber is shown as rotated such that the light is incident in a direction where both coating walls are of essentially equal thickness. The FFT of FIG. 5(b) contains a peak P1, P2 at 30 μm, a peak P3, P4 at 624.5 μm, and a last peak P5 at 657 μm. Peaks P1, P2 correspond to the interference between interfaces A and B (for peak P1) and C and D (for peak P2). The coating wall thicknesses $T_1$ and $T_2$ can then be calculated as follows:

$$T_1 = P_1/(2n_c), \text{ and}$$

$$T_2 = P_2/(2n_c),$$

where $n_c$ is defined as the refractive index of the coating material. Peaks P3 and P4 arise due to the interference between interfaces A and C (P3), and B and D (P4), and peak P5 arises due to the interference between interfaces A and D.

The graphs contained in FIGS. 5(c) and (d), as mentioned above, contain the spectrogram and FFT, respectively, of the same fiber, rotated 90° with respect to the measurement performed for the results in FIGS. 5(a) and (b). As shown in the inset of FIG. 5(d), the wall thicknesses of the coating layer on either side of the glass are unequal for this particular orientation. Referring to FIG. 5(d), peak P1 is shown at a value of 17.6 μm, P2=46 μm, P3=607 μm, P4=635 μm and P5=654 μm.

The coating wall thickness can also be calculated as $(P5-P3)/(2n_c)$ and $(P5-P4)/(2n_c)$. The uncoated fiber diameter is given by $D_s=(P5-P1-P2)/(2n_s)$, where $n_s$ is defined as the refractive index of silica glass (the fiber core region). In looking at the FFTs of FIGS. 5(b) and (d), it is noted that the amplitude of the FFT peak due to the interference between interfaces B and C is undetectable because the reflectivities of both contributing surfaces are small, owing to the small index difference between the cladding and the coating. The coated fiber diameter is defined as $D_c=D_s+(P1+P2)/(2n_c)$. Comparing the two FFTs of FIGS. 5(b) and (d), the presence of unequal coating thickness for the FFT of FIG. 5(d) is shown to split the two peaks P1 and P2, and split the two peaks P3 and P4. Thus, in accordance with the present invention, by performing measurements along two orthogonal diagonals, the inventive FDOCT technique can be used to monitor the fiber/coating concentricity.

Figure 6:
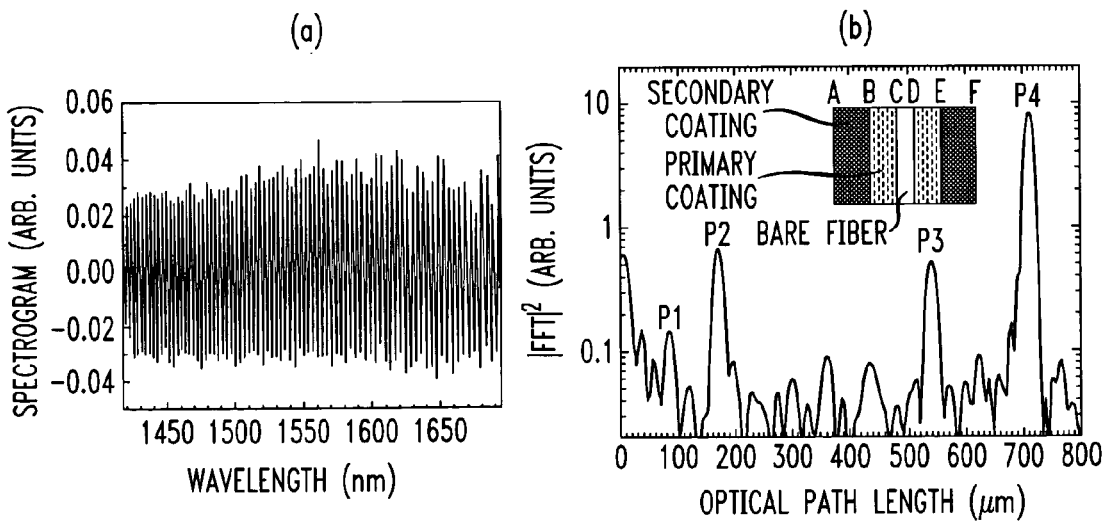
FIGS. 6(a) and (b) illustrate an exemplary spectrogram and FFT, respectively, of an exemplary dual-coated fiber, measured using the FDOCT technique of the present invention.

Standard telecommunication optical fibers contain a dual coat of polymers. Often, these polymer coatings are simultaneously applied and, as a result, the diameter of the first coating (often referred to as the "primary coating diameter" or POD), cannot be measured. The diameter of the POD is an important factor in the characterization of the fiber, since it affects the bend loss properties of the fiber. The FDOCT technique of the present invention, by virtue of the ability to discern the separate peaks in the FFT of such a dual coated fiber, can be applied to measure the location of the interface between the two coatings, where the POD can then be calculated from this value. FIGS. 6(a) and (b) illustrate an exemplary spectrogram and FFT, respectively, for a dual-coated fiber, as illustrated in the inset in FIG. 6(b). Referring to FIG. 6(b). peak P1 is associated with the air/secondary coating interface plus the secondary/primary coating interface (i.e., AB and/or EF, with reference to the insert). The peak P2 is associated with the air/secondary coating interface plus the "nearest" primary coating/glass interface (AC and/or DF), and similarly, peak P3 is associated with the air/secondary coating interface plus the "farthest" primary coating/glass interface (AD and/or CF). Lastly, peak P4 is associated with the air/secondary coating interface plus the air/primary coating interface (i.e., AF, which equals the coated fiber diameter). The thicknesses BC and DE, which are of interest for the POD measurement, can be calculated as (P2−P1)/(2n), where n is the refractive index of the primary coating.

Figure 7:
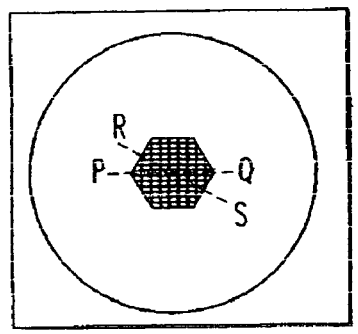
FIG. 7 illustrates an exemplary cross-sectional fiber of a microstructured optical fiber that may be characterized using the arrangement of the present invention as illustrated in FIG. 3.

Microstructured optical fibers consist of a periodic pattern of air holes that run along the fiber length, where a cross-section of one exemplary microstructured fiber is illustrated in FIG. 7. These fibers exhibit unique guidance properties that cannot be replicated by conventional fibers, where these properties critically depend on the size and distribution of air holes within the fiber. Thus, it is crucial to be able to monitor and control the air hole characteristics during the fiber manufacturing process. Advantageously, the FDOCT technique of the present invention may be used to measure the location and distribution of air holes within such a microstructured optical fiber.

Figure 8:
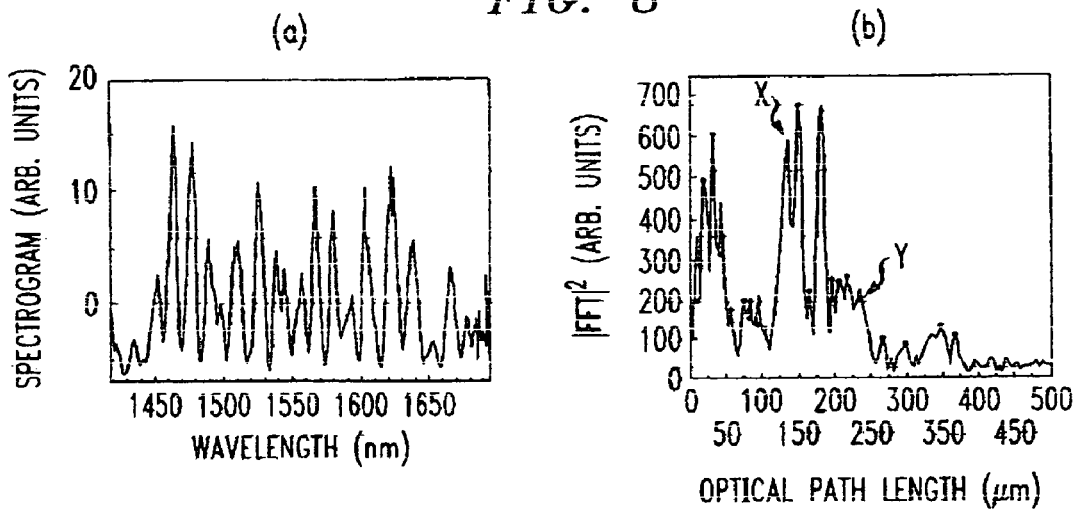
FIGS. 8(a) and (b) illustrate the spectrogram and FFT, respectively associated with measuring a fiber such as shown in FIG. 7 in the arrangement of FIG. 3.
Figure 9:
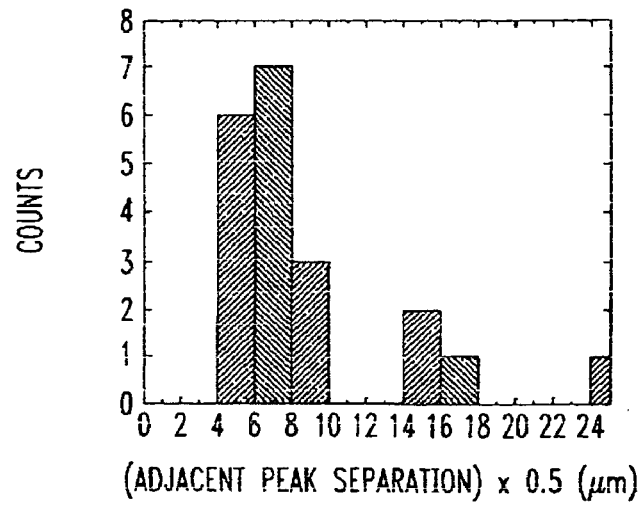
FIG. 9 is a histogram of the adjacent FFT peak separations for the FFT of FIG. 8(b)

In this case, a broadband continuum source is used in arrangement 25 of FIG. 3, and a rotation element 59 is inserted in arrangement 25 so that the fiber can be rotated. In an experiment situation, a camera was used with arrangement 25 to view the endface of the fiber and allow for precise control of the crystal orientation of the periodic air hole pattern with respect to the incident beam. In one experiment, a fiber with an overall diameter D=125 μm was used, with a triangular regular lattice crystal consisting of six rings of air holes of diameter d=2.5 μm, and adjacent hole spacing of Λ=3.2 μm. The core region was defined by the "absence" of an air hole through the center of the fiber. FIGS. 8(a) and (b) illustrate the spectrogram and associated FFT, respectively, for a fiber such as shown in FIG. 7, where the black dots in the FFT denote the positions of peaks. A histogram of the adjacent FFT peak separations is shown in FIG. 9, where the values are divided by two from the values in FIG. 8(b) to correct for the round trip through the fiber.

Referring to FIG. 8(b), it is evident that there are three ranges of distances at which the peaks are concentrated. The first range extends over short distances (i.e., less than approximately 100 μm). These peaks are associated with the cross correlation of the crystal structure with itself and their locations denote the separation between the interfering features in the crystal structure. The amplitude of the FFT peaks are shown to decrease with distance, as a result of the degradation of the overlap between reflections from structures separated by a large distance. The peaks in the second range (i.e., from about 100 μm to approximately 250 μm) arise from the interference between reflections from the fiber surface and the crystal structure. The beginning of this range is denoted by a strong peak (present at 133 μm and identified with an "X" in FIG. 8(b)), towards the end of the first range. This peak arises due to the interference between the front surface of the fiber and the hole in the crystal pattern that is closest to the fiber surface. The position of this peak is related to the length of axis PQ of the crystal (as shown in FIG. 7) by an amount $D-X/n_s$, where $n_s$ is (as defined above) the refractive index of silica. Using this formula, the length of axis PQ for this particular example is 33 μm, as compared to a microscope measurement of this length yielding 38 μm. The last peak in this second set is located at Y=233.4 μm, where this peak is associated with the fiber front surface and the hole furthest from this surface. As mentioned above, the location of the peaks in this second set represent the distance between the fiber front surface and the holes. Hence, the difference between successive peak locations can be related to the separation between adjacent holes, where this separation yields a consistent value of approximately 7.8 μm, consistent with a conventional crystal pattern.

The third set of peaks ranges from approximately 250 μm to approximately 370 μm, and as evident in FIG. 8(b), they have a much smaller value than either the first set or the second set. These peaks may arise due to multiple reflections within the crystal structure itself. The peaks around 360 μm are consistent with the interference between the front and rear surfaces of the fiber itself, and are thought to have a significantly lower amplitude as a result of the reduced strength of light that reflects back from the rear fiber surface. The histogram illustrated in FIG. 9 is defined as one-half of the separation between the FFT peaks. As shown, the spacing between the peaks, which is indicative of the spacing between the scatterers, lies mainly between four and eight microns. These values change when the orientation of the crystal is changed with respect to the incident beam.

As mentioned above, fiber tension has been found to directly impact the index difference between various regions of the fiber and, therefore, is one of the most important draw parameters. The FDOCT technique of the present invention can be used to perform a non-perturbative measurement of the birefringence of a fiber under tension.

During manufacture, axial tension is applied to the optical fiber as it is drawn from the preform. Tension causes an axial stress $\sigma = T/\pi r^2$, where T is the applied tension and r is the radius of the fiber. The applied tension induces a birefringence so that light polarized along the fiber axis experiences a different refractive index $n_z$ as compared to the index $n_p$ for light polarized perpendicular to the axis. The difference in refractive index is related to the applied stress by the relation $\sigma = C(n_z - n_p)$, where C is a defined material constant having a value of $2.77 \times 10^{11}$ N/m$^2$. Therefore, the index difference is shown to vary linearly with applied tension, using the following relation:

$$n_z - n_p = \frac{T}{C\pi r^2}.$$

Figure 10:
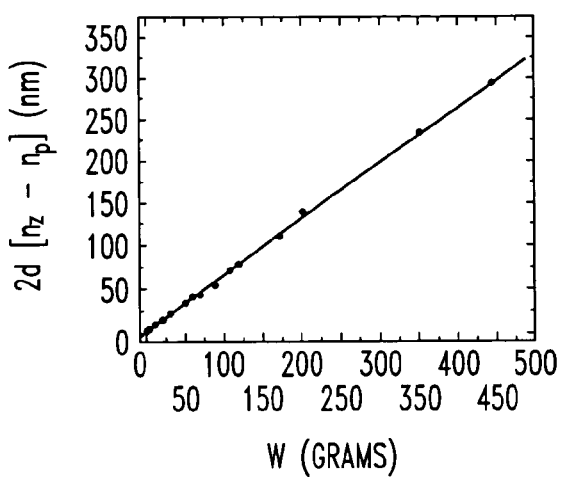
FIG. 10 is a plot of the change in optical path length as a function of applied tension measured using the arrangement of the present invention as shown in FIG. 3, with the addition of a polarizer to find the tension-induced change in index along each polarization.

In one experiment to investigate the use of the inventive FDOCT technique in analyzing the effects of tension, tension was applied by suspending known weights from a coreless silica fiber of diameter D=125 μm. A polarizer (shown as element 55) was added between the collimating and focusing lenses 42 of arrangement 25 of FIG. 3 in order to select the polarization of the broadband light source. For each weight, the optical thickness was measured using the inventive FDOCT method for polarizations both parallel and perpendicular to the fiber axis. FIG. 10 shows the difference in optical path lengths $2d(n_z - n_p)$ as a function of the weight suspended from the fiber. A linear fit to the data yields a slope of approximately 0.6 nm/g, which is within 10% of the theoretical value of 0.72 nm/g. The use of the FDOCT technique of the present invention to measure this tension has several advantages over other prior art fiber tension gauges. First, it directly measures the draw stress, rather than the tension, which is a more fundamental quantity affecting the fiber properties. Further, the technique of the present invention simultaneously measures the fiber diameter, thereby providing two important draw measurements using a single measurement arrangement, which reduces the footprint on the draw tower (where space is always at a premium). Additionally, the measurements are independent of draw tower height and device calibration is not required. As shown in FIG. 10, the measurement remains linear over the entire range of draw tensions, leading to the conclusion that the accuracy of the measurement is unaffected by displacement and ellipticity of the fiber.

It is often desirable to measure two unknown parameters of a fiber, such as the geometrical thickness of a fiber and its refractive index, or the thickness of two layers that have a relatively small refractive index difference, such that the reflection from their interface is too small to be detected. Knowledge of the refractive index of the fiber can yield information on the mechanical stress, twist, temperature, etc. of the fiber. Two unknown parameters of the fiber can be solved for from independent measurements of the optical and geometrical thicknesses of the fiber. Measuring arrangement 60, as illustrated in FIG. 11, can be used to perform these measurements in accordance with the present invention.

Figure 11:
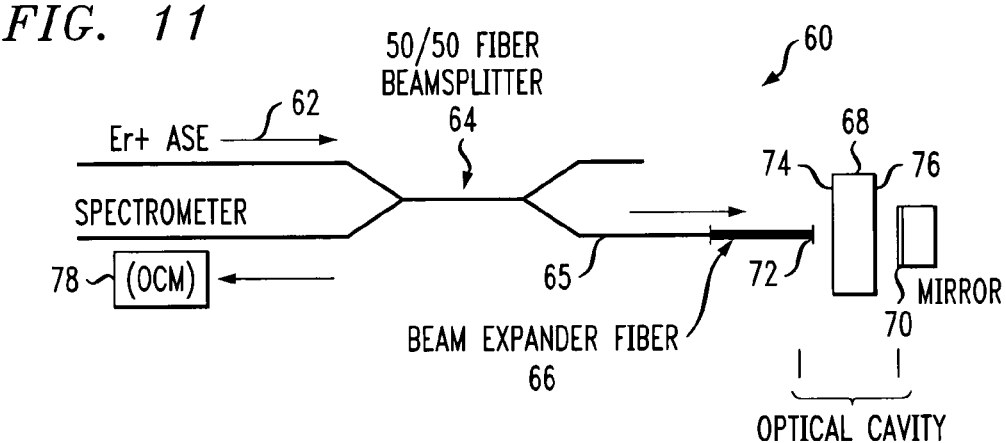
FIG. 11 is an alternative arrangement of the present invention, including an optical cavity formed to surround the fiber being measured, such as by using a reflective surface properly positioned beyond the fiber, this alternative arrangement is utilized to measure two unknown properties of a fiber.

Referring to FIG. 11, measuring arrangement 60 is shown to be similar to arrangement 25 of FIG. 3, including a broadband source 62 applied as an input to a 50:50 beam splitter 64. In this case, an output arm 65 of beam splitter 64 is coupled to a beam expander 66 (in place of the focusing lens arrangement of FIG. 5). Beam expander 66 functions to collimate the beam, and also acts as the source, as well as the point receiver, in this particular arrangement. The output of beam expander 66 is then used to illuminate the object 68, such as an optical fiber. In the embodiment of measuring arrangement 60, a reflective surface 70 is disposed beyond object 68 so as to reflect the remaining portion of the light signal passing completely through object 68. An optical cavity is thus formed by the parallel reflecting surfaces of tip 72 of beam expander 66 and reflective surface 70.

In accordance with the measurement technique of the present invention, broadband light from source 62 passes through beam splitter 64 and beam expander 66. As before, a portion of this light will be reflected at each interface between the different materials. In this case, reflections will occur at beam expander tip 72, front surface 74 of object 68, rear surface 76 of object 68 and reflective surface 70. All of these reflections are coupled back into beam expander 66 at tip 72, and then propagate back through beam splitter 64 and are applied as an input to a spectrometer 78, which records the spectral intensity modulation.

Figure 12:
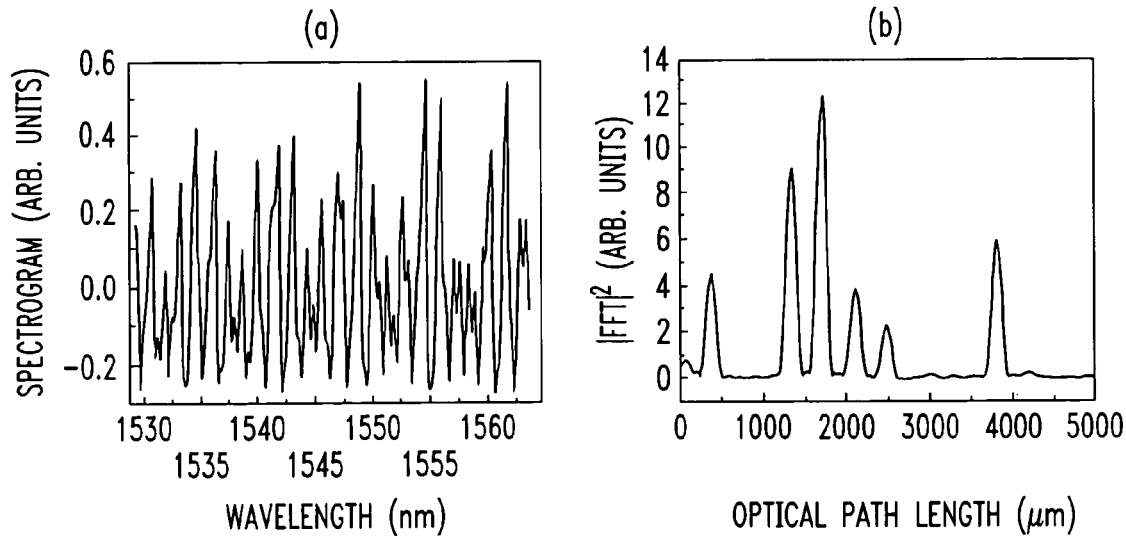
FIGS. 12(a) and (b) illustrate the spectrogram and FFT, respectively, of a "bare" fiber measured using the arrangement of FIG. 11.

FIGS. 12(a) and (b) contain the spectrogram and FFT, respectively, when a bare fiber is inserted as object 68 in measuring arrangement 60 of FIG. 1. Front and rear surfaces 74 and 76 form six optical cavities with the walls of the cavity defined by tip 72 and reflective surface 70, each cavity having a different optical length. As long as the position of object 68 is properly adjusted within the cavity formed by surfaces 72 and 70, each of the six cavities will appear as a distinct, non-overlapping component in the FFT domain, as corresponding to its optical path length. In accordance with the present invention, each of these components may then be filtered and its inverse FFT taken to retrieve the corresponding cosine modulation. The cosine modulation is then fitted to retrieve the optical path length.

The optical thickness of the fiber itself is given by peak 74-76, as shown in FIG. 12(b). The geometrical thickness is given by, $$d = \frac{d_{OC} - d_{72/74} - d_{68/70}}{n_o},$$

where $d_{OC}$ is defined as the length of the optical cavity between tip 72 and reflective surface 70 without the fiber in place. The refractive index of the fiber can be defined by relation $d_{74/76}/d$.

It is to be understood that the various embodiments and uses of the inventive FDOCT measurement arrangement are intended to be merely illustrative of the inventive concept. Various other embodiments and modifications may be made by those skilled in the art without departing from the spirit and scope of the present invention, as defined by the claims appended hereto.

What is claimed is:

1. A Fourier domain optical coherence tomography (FDOCT) arrangement for measuring predetermined characteristics of an optically transparent object, the FDOCT arrangement comprising a broadband lightwave source for generating a broadband optical test signal;

an optical beam splitter including a pair of input arms and a pair of output arms, a first input arm coupled to the output of the broadband lightwave source for supporting the propagation of the broadband optical test signal through the optical beam splitter, a lensing arrangement coupled to a first output arm of the optical beam splitter, the lensing arrangement for first collimating and then focusing the broadband optical test signal toward an optically transparent object to be measured; and an optical Fourier transform device, coupled to a second input arm of the pair of input arms of the optical beam splitter, said optical Fourier transform device receptive to a plurality of interfering reflected signals from the optically transparent object disposed beyond the lensing arrangement, the optical Fourier transform device for providing a spectrogram signal of the plurality of interfering reflected signals and generating a fast Fourier transform of the spectrogram signal associated with the optical path length of the optically transparent object, wherein signal peaks within the fast Fourier transform are related to transition interfaces between materials in the optically transparent object and are associated with the predetermined characteristics of the optically transparent object.

2. The arrangement as defined in claim 1 wherein at least one predetermined characteristics of the optically transparent object is the thickness of a layer within the optically transparent object, the thickness determined by filtering the peaks in the fast Fourier transform, and performing an inverse fast Fourier transform on the filtered signal within the optical Fourier transform device to retrieve a cosine waveform corresponding to the interference between two adjacent layers within the optically transparent object.

3. The arrangement as defined in claim 1 wherein the lensing arrangement comprises a first collimating lens and a second focusing lens.

4. The arrangement as defined in claim 1 wherein the optical beam splitter is a 50:50 beam splitter.

5. The arrangement as defined in claim 1 wherein the broadband lightwave source comprises an erbium-doped fiber lightwave source.

6. The arrangement as defined in claim 1 wherein the broadband lightwave source comprises a continuum lightwave source.

7. The arrangement as defined in claim 1 wherein the arrangement is utilized with an optical fiber as the optically transparent object.

8. A method for determining the thickness of separate layers within a multi-layer optical fiber using a Fourier domain optical coherence tomography (FDOCT) technique, the method comprising the steps of:

illuminating the multi-layer optical fiber, in a direction essentially perpendicular to the fiber axis, with a focused broadband light;

collecting reflected signals from a plurality of interfaces between the separate layers within the multi-layer optical fiber at an optical spectrometer, the plurality of interfaces including interfaces between air and an outer fiber surface and interfaces between said separate layers within the multi-layer optical fiber, the reflected signals forming an interference pattern of a cosine signal form;

applying a fast Fourier transform to the interference pattern to generate a frequency domain representation associated with the optical path length of the optical fiber, where peaks in the fast Fourier transform are associated with interfaces between different layers within the optical fiber; and determining the thickness of said separate layers by measuring the distance between adjacent peaks in the fast Fourier transform.

9. The method as defined in claim 8, wherein the method further comprises the steps of:

filtering the peaks within the generated fast Fourier transform;

applying an inverse fast Fourier transform to the filtered signal to retrieve a cosine waveform corresponding to the interference between any two adjacent surfaces; and analyzing the cosine waveform to calculate the distance between any two interfaces within the optical fiber and determine the thickness of each separate layer within the multi-layer optical fiber.

10. The method as defined in claim 8 wherein, the method comprises the further steps of:

re-orienting the fiber with respect to the illuminating broadband light so as to illuminate the fiber surface at a location 90° from an initial set of measurements to measure characteristics associated with the eccentricity between the optical fiber and an outer coating layer;

comparing the thickness results from the re-oriented set of measurements with the thickness results from the initial set of measurements, wherein a difference in thickness for the outer coating layer between the two sets of measurements is indicative of the presence of eccentricity between the optical fiber and the outer coating layer; and generating an output signal associated with the amount of eccentricity present between the optical fiber and the outer coating layer.

11. The method as defined in claim 8 wherein the method further comprises the steps of:

applying the reflected signals as an input to a polarization beam splitter;

collecting reflected signals of a first polarization state at a first optical spectrometer;

collecting reflected signals of a second, orthogonal polarization state at a second optical spectrometer;

applying a fast Fourier transform to each of the interference patterns generated by the first and second optical spectrometers; and comparing the thickness results associated with each fast Fourier transform to measure characteristics of eccentricity between the optical fiber and the outer coating layer, wherein a difference in thickness results for the outer cladding layer between the orthogonal polarization states is indicative of the presence of eccentricity between the optical fiber and the outer coating layer.

12. The method as defined in claim 8 wherein the method further comprises the step consists of:

recognizing the presence of unwanted peaks in the fast Fourier transform to measure the characteristics of the presence of unwanted sub-surface features, unwanted peaks defined as any peaks not associated with known interfaces between different layers within the fiber structure.

13. The method as defined in claim 8 wherein in performing the illuminating step, the illuminated optical fiber comprises a microstructured optical fiber including a plurality of regularly arranged air holes, and in performing the step of applying the fast Fourier transform, measuring the fiber characteristics associated with the size and distribution of the air holes within the fiber.

14. The method as defined in claim 13 wherein the method comprises the further step of reviewing the fast Fourier transform peaks, where the difference between successive peak locations is related to the separation between adjacent air holes.

15. The method as defined in claim 8 wherein the method comprises the further steps of:
   determining a draw tension applied to the fiber during a draw process, and for each draw tension;
   controlling the polarization of the illuminating signal such that a first set of measurements is associated with a parallel polarization state of the illuminating signal, with respect to the fiber axis, and a second set of measurements is associated with a perpendicular polarization state of the illuminating signal, with respect to the fiber axis;
   generating a first spectrogram associated with the parallel polarization illumination and a second spectrogram associated with the perpendicular polarization illumination; and
   comparing the difference in spectrograms for the parallel and perpendicular polarizations, the difference associated with the presence of birefringence in the fiber being drawn.

16. The method as defined in claim 8 wherein the method further consists of placing the fiber in an optical cavity prior to illuminating the fiber so as to increase the number of reflective surfaces and provide additional information in the generated fast Fourier transform associated with the geometric thickness and optical thickness of the optical fiber.

* * * * *